United States Patent
Jauh et al.

(10) Patent No.: US 11,611,903 B2
(45) Date of Patent: Mar. 21, 2023

(54) DATA TRANSMISSION METHOD AND DEVICE FOR MULTI-LINK WI-FI SYSTEM

(71) Applicant: SPREADTRUM COMMUNICATIONS (SHANGHAI) CO., LTD., Shanghai (CN)

(72) Inventors: Yuhren Jauh, Shanghai (CN); Chinghwa Yu, Shanghai (CN); Yanchao Xu, Shanghai (CN); Long Wang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/956,928

(22) PCT Filed: Mar. 20, 2020

(86) PCT No.: PCT/CN2020/080457
§ 371 (c)(1),
(2) Date: Jun. 22, 2020

(87) PCT Pub. No.: WO2020/215948
PCT Pub. Date: Oct. 29, 2020

(65) Prior Publication Data
US 2021/0368388 A1 Nov. 25, 2021

(30) Foreign Application Priority Data
Apr. 22, 2019 (CN) .......................... 201910327698.0

(51) Int. Cl.
H04W 28/06 (2009.01)
H04L 5/00 (2006.01)
(Continued)

(52) U.S. Cl.
CPC ............ H04W 28/06 (2013.01); H04L 5/0048 (2013.01); H04W 28/18 (2013.01); H04W 28/26 (2013.01)

(58) Field of Classification Search
CPC ..... H04W 28/06; H04W 28/18; H04W 28/26; H04W 28/02; H04W 28/16; H04L 5/0048
See application file for complete search history.

(56) References Cited

U.S. PATENT DOCUMENTS

| | | |
|---|---|---|
| 2016/0309467 A1 | 10/2016 | Yerramalli et al. |
| 2017/0086204 A1 | 3/2017 | Jung et al. |

(Continued)

FOREIGN PATENT DOCUMENTS

| | | |
|---|---|---|
| CN | 101873700 A | 10/2010 |
| CN | 103580773 A | 2/2014 |

(Continued)

OTHER PUBLICATIONS

CNIPA First Office Action for corresponding CN Application No. 201910327698.0; dated, Mar. 18, 2021.

(Continued)

*Primary Examiner* — Justin T Van Roie
(74) *Attorney, Agent, or Firm* — Cantor Colburn LLP (57) ABSTRACT

Data transmission method and device are provided. The method includes: determining a portion of a plurality of links as dedicated link, and the other portion of the plurality of links as ordinary link, wherein the dedicated link is configured to transmit control frames which include ordinary control frames and dedicated control frames, and the ordinary link is configured to transmit data frames and ordinary control frames; determining links for control frames to be transmitted and data frames to be transmitted; and when the dedicated link or the ordinary link obtains a transmission opportunity, transmitting a control frame or a (Continued)

data frame at a head of a queuing list of the link. By configuring the dedicated link, transmission efficiency of the control frames may be improved, compatibility with existing systems is relatively good, and complexity of design is relatively low.

9 Claims, 6 Drawing Sheets

(51) Int. Cl.
*H04W 28/18* (2009.01)
*H04W 28/26* (2009.01)

(56) References Cited

U.S. PATENT DOCUMENTS

| | | | |
|---|---|---|---|
| 2017/0099508 A1 | 4/2017 | Hamzeh | |
| 2017/0230146 A1* | 8/2017 | Sun | H04L 1/1607 |
| 2017/0311204 A1 | 10/2017 | Cariou et al. | |
| 2018/0206143 A1 | 7/2018 | Patil et al. | |
| 2018/0278697 A1 | 9/2018 | Cariou et al. | |
| 2021/0235322 A1* | 7/2021 | Jauh | H04L 5/0055 |

FOREIGN PATENT DOCUMENTS

| | | |
|---|---|---|
| CN | 105553868 A | 5/2016 |
| CN | 106455107 A | 2/2017 |
| CN | 108541399 A | 9/2018 |
| CN | 109640310 A | 4/2019 |
| WO | 2018136520 A1 | 7/2018 |

OTHER PUBLICATIONS

International Search Report with Written Opinion of the International Searching Authority for International Application No. PCT/CN2020/080457; dated May 29, 2020. No English available to date.
EPO Extended European Search Report for corresponding EP Application No. 20795704.4, dated Dec. 5, 2022.
Perez et al., "IEEE 802.11be Extremely High Throughput: The Next Generation of Wi-Fi Technology Beyond 802.11 ax", 2019, 6 pages.

* cited by examiner

DATA TRANSMISSION METHOD AND DEVICE FOR MULTI-LINK WI-FI SYSTEM

CROSS-REFERENCE TO RELATED APPLICATIONS

This application is the national stage of International Application No. PCT/CN2020/080457, filed on Mar. 20, 2020. Priority under 35 U.S.C. § 119(a) and 35 U.S.C. § 365(b) is claimed from Chinese Patent Application No. 201910327698.0, filed on Apr. 22, 2019, and entitled "DATA TRANSMISSION METHOD AND DEVICE", the entire disclosure of which is incorporated herein by reference.

TECHNICAL FIELD

The present disclosure generally relates to communication field, and more particularly, to a data transmission method and device.

BACKGROUND

In a conventional Wireless Fidelity (Wi-Fi) system, there is merely one Media Access Control (MAC) layer and one physical layer. Therefore, control and management frames (referred as control frames hereinafter) and data frames are transmitted merely on a single link in the Wi-Fi system. Therefore, in some cases, control information of the system cannot be transmitted in time.

At present, there are some solutions for multi-link Wi-Fi systems. However, in multi-link Wi-Fi systems, transmission efficiency of control information still needs to be improved.

SUMMARY

In an embodiment of the present disclosure, a data transmission method is provided, wherein the method is applied in a multi-link Wi-Fi system which includes a plurality of links, each of the plurality of links includes a queuing list for determining a transmission order of data in the link, and the method includes: determining a portion of the plurality of links as dedicated link, and the other portion of the plurality of links as ordinary link, wherein the dedicated link is configured to transmit control frames which include ordinary control frames and dedicated control frames, and the ordinary link is configured to transmit data frames and ordinary control frames; determining links for control frames to be transmitted and data frames to be transmitted; and when the dedicated link or the ordinary link obtains a transmission opportunity, transmitting a control frame or a data frame at a head of a queuing list of the link.

Optionally, determining a portion of the plurality of links as dedicated link includes: an Access Point (AP) configuring a portion of the plurality of links as dedicated link.

Optionally, after the portion of the plurality of links is determined as dedicated link, the method further includes: the AP broadcasting index information of the dedicated link.

Optionally, determining a portion of the plurality of links as dedicated link includes: an AP configuring a portion of the plurality of links as dedicated link in a default way.

Optionally, determining a portion of the plurality of links as dedicated link includes: a station (STA) receiving index information of the dedicated link; and configuring a portion of the plurality of links as dedicated link based on the index information.

Optionally, determining a portion of the plurality of links as dedicated link includes: a STA configuring a portion of the plurality of links as dedicated link in a default way.

Optionally, determining links for control frames to be transmitted and data frames to be transmitted includes: configuring the control frames to the dedicated link.

Optionally, determining links for control frames to be transmitted and data frames to be transmitted includes: dividing the control frames to a plurality of groups; and duplicating the plurality of groups of control frames to queuing lists of different dedicated links.

Optionally, after transmission of one ordinary control frame on the ordinary link is completed, the ordinary control frame can be transmitted again on the dedicated link; or, after transmission of one ordinary control frame on the dedicated link is completed, the ordinary control frame can be transmitted again on the ordinary link.

Optionally, after one ordinary control frame starts to be transmitted on the ordinary link, the ordinary control frame can be transmitted again on the dedicated link; or, after one ordinary control frame starts to be transmitted on the dedicated link, the ordinary control frame can be transmitted again on the ordinary link.

Optionally, after transmission of one ordinary control frame on one link is completed, the ordinary control frame cannot be transmitted again on other links.

In an embodiment of the present disclosure, a data transmission device including a memory and a processor is provided, wherein the memory has a computer program stored therein, and when the processor executes the computer program, the above data transmission method is performed.

Embodiments of the present disclosure may provide following advantages.

In embodiments of the present disclosure, the data transmission method includes: determining a portion of a plurality of links as dedicated link, and the other portion of the plurality of links as ordinary link, wherein the dedicated link is configured to transmit control frames which include ordinary control frames and dedicated control frames, and the ordinary link is configured to transmit data frames and ordinary control frames; determining links for control frames to be transmitted and data frames to be transmitted; and when the dedicated link or the ordinary link obtains a transmission opportunity, transmitting a control frame or a data frame at a head of a queuing list of the link. By configuring the dedicated link, transmission efficiency of the control frames may be improved, compatibility with existing systems is relatively good, and complexity of design is relatively low.

DETAILED DESCRIPTION

Figure 1:
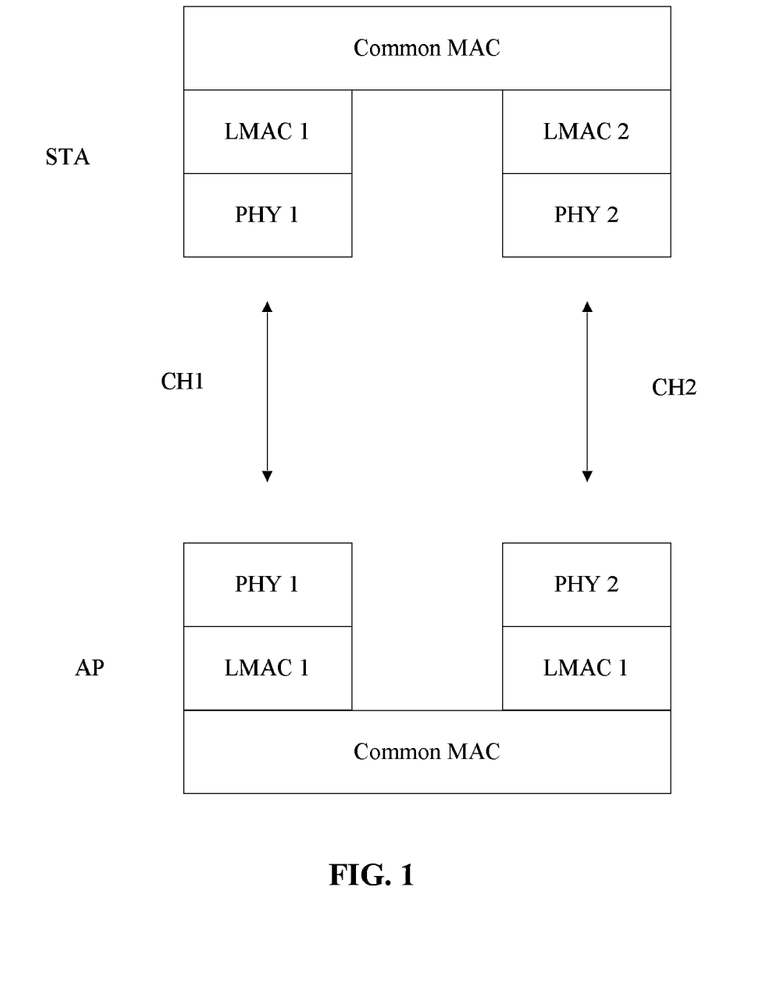
FIG. 1 is a diagram of a multi-link Wi-Fi system according to an embodiment.

Referring to FIG. 1, FIG. 1 is a diagram of a multi-link Wi-Fi system according to an embodiment.

The multi-link Wi-Fi system may include a STA, an AP and multiple links. Data frames are transmitted on the multiple links between the STA and the AP. In the embodiment as shown in FIG. 1, the multi-link Wi-Fi system includes a first link CH1 and a second link CH2.

In some embodiments, the first link CH1 and the second link CH2 may occupy different frequency band resources to implement data transmission. For example, the first link CH1 may occupy a frequency band with a center frequency of 2 GHz, and the second link CH2 may occupy a frequency band with a center frequency of 5 GHz. In some embodiments, the first link CH1 and the second link CH2 may occupy a same frequency band to implement data transmission. In some embodiments, the frequency band shared by the two links may be relatively wide so as to be used for simultaneous data transmission on the two links, or may be used by the two links for data transmission via time division multiplexing.

In the embodiment as shown in FIG. 1, at the STA, data frames to be transmitted may be arranged into a queuing list of the first link CH1 and a queuing list of the second link CH2, respectively. In some embodiments, the data frames to be transmitted can be arranged into queuing lists of different links in the form of indexes.

In the embodiment as shown in FIG. 1, at either the STA or the AP, a network layer includes a MAC layer (Common MAC), and below the MAC layer there are a first sub MAC layer LMAC1, a second sub MAC layer LMAC2, a first physical layer PHY1 and a second physical layer PHY2. Specifically, the first sub MAC layer LMAC1 and the first physical layer PHY1 are configured to enable the STA or the AP to transmit data on the first link CH1, and the second sub MAC layer LMAC2 and the second physical layer PHY2 are configured to enable the STA or the AP to transmit data on the second link CH2. In some embodiments, the multi-link Wi-Fi system include multiple links, thus, the multi-link Wi-Fi system may include multiple sub MAC layers and multiple corresponding physical layers.

Figure 2:
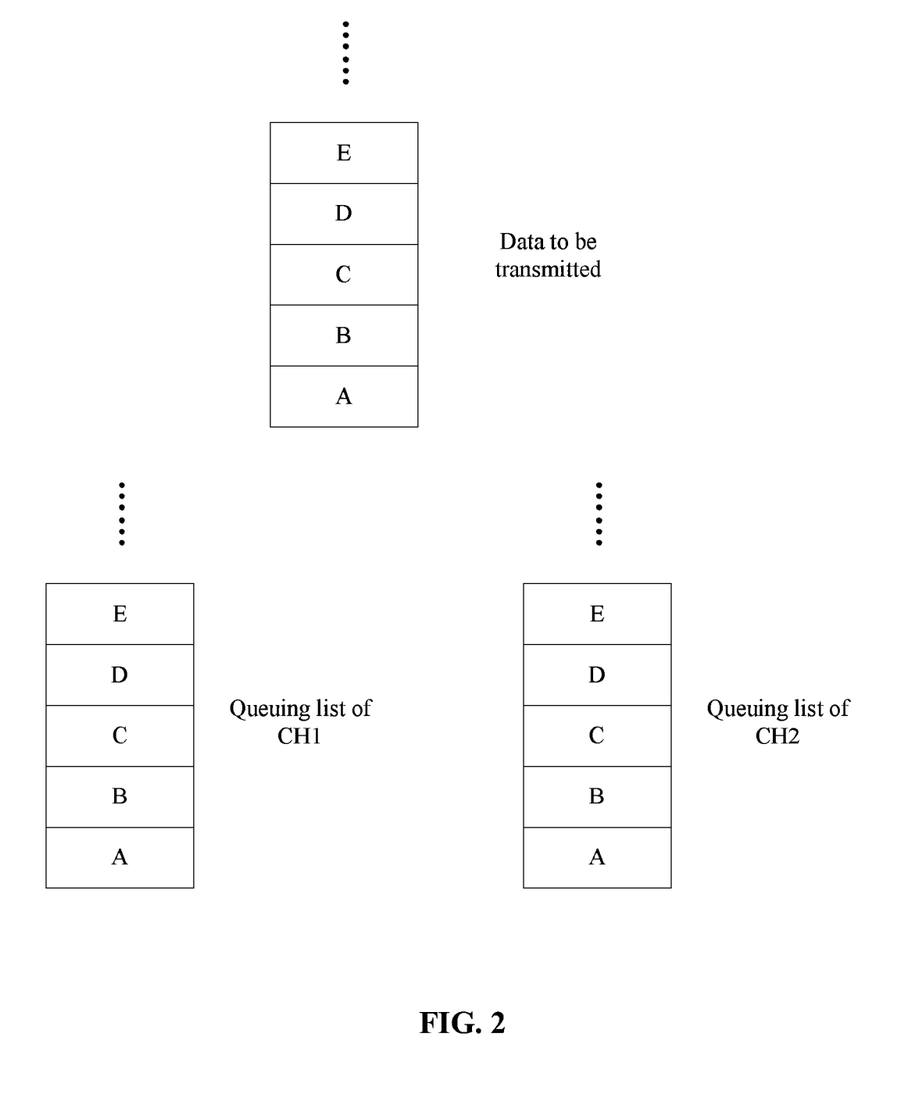
FIG. 2 is a diagram of queuing lists when data transmission is performed in the multi-link Wi-Fi system as shown in FIG. 1.

Referring to FIG. 2, FIG. 2 is a diagram of queuing lists when data transmission is performed in the multi-link Wi-Fi system as shown in FIG. 1. The data frames to be transmitted include a data frame A, a data frame B, a data frame C, a data frame D and a data frame E. In an existing multi-link Wi-Fi system, the data frames to be transmitted are arranged in a queuing list of each link, and may be transmitted on any link.

Figure 3:
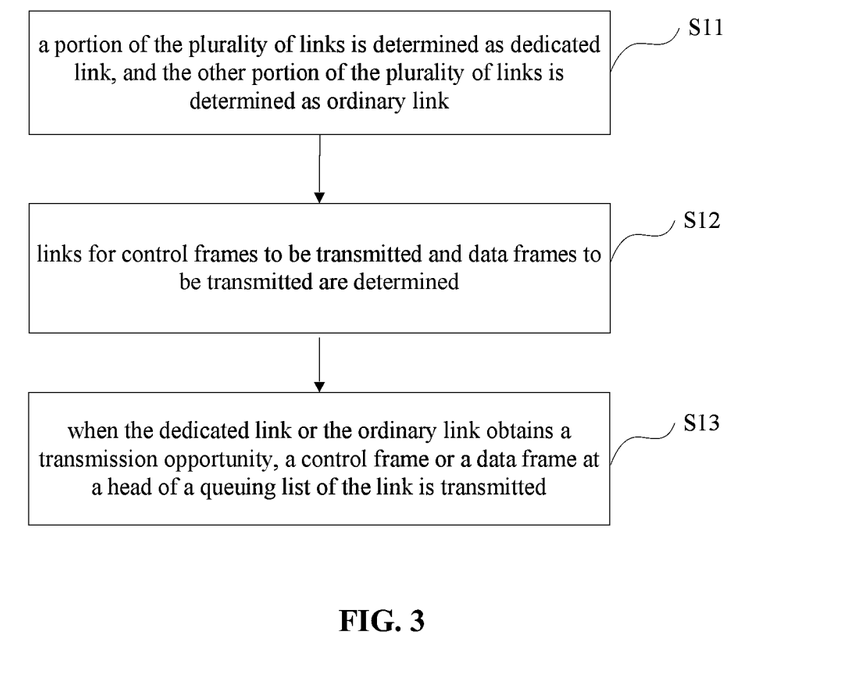
FIG. 3 is a flow chart of a data transmission method according to an embodiment.

Referring to FIG. 3 to FIG. 8, FIG. 3 is a flow chart of a data transmission method according to an embodiment, and FIG. 4 to FIG. 8 are diagrams of queuing lists in the method as shown in FIG. 3. The method may be applied in a STA or an AP.

The method is applied in a multi-link Wi-Fi system which includes a plurality of links, and each of the plurality of links includes a queuing list for determining a transmission order of data in the link. The data includes data frames and control frames.

In S11, a portion of the plurality of links is determined as dedicated link, and the other portion of the plurality of links is determined as ordinary link.

The dedicated link is configured to transmit control frames which include ordinary control frames and dedicated control frames, and the ordinary link is configured to transmit data frames and ordinary control frames. That is, the ordinary control frames may be transmitted on the ordinary link or the dedicated link, while the dedicated control frames may be transmitted merely on the dedicated link, and the data frames may be transmitted merely on the ordinary link. The control frames contain control information of the system, and the data frames contain service data.

Figure 4:
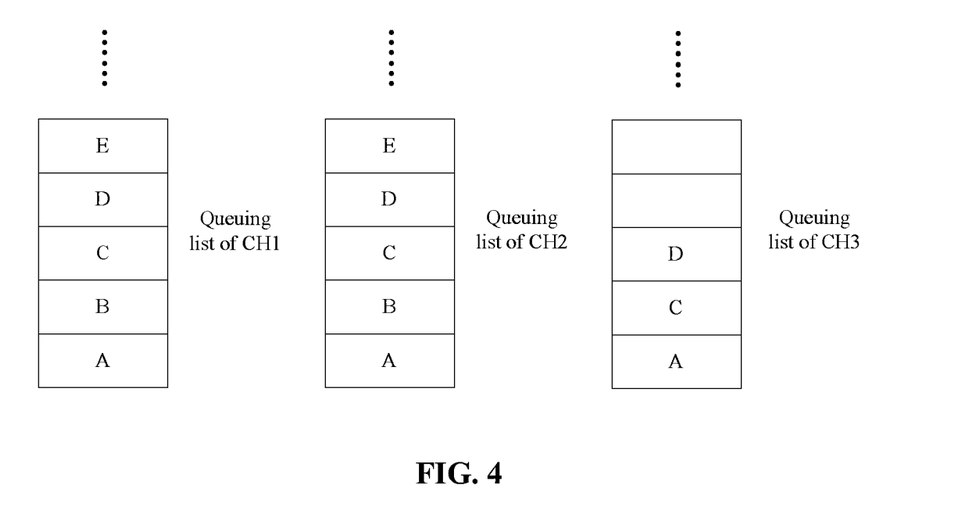
FIG. 4 is a diagram of queuing lists in the method as shown in FIG. 3.

Referring to FIG. 4, in the embodiment as shown in FIG. 4, the multi-link Wi-Fi system includes a first link CH1, a second link CH2 and a third link CH3, and queuing lists of these links are illustrated in FIG. 4. The third link is a dedicated link, and the first and second links are ordinary links.

Figure 5:
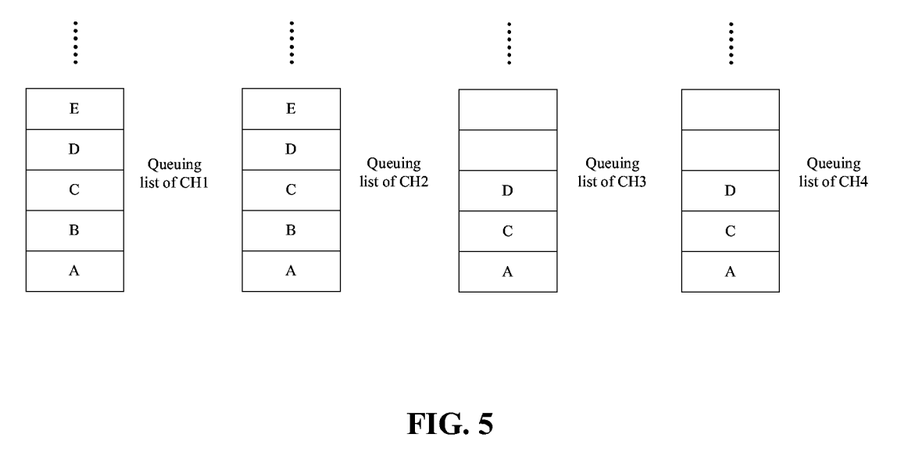
FIG. 5 is a diagram of queuing lists in the method as shown in FIG. 3.

In the embodiment as shown in FIG. 5, the multi-link Wi-Fi system includes a first link CH1, a second link CH2, a third link CH3 and a fourth link CH4, and queuing lists of these links are illustrated in FIG. 5. The third and fourth links are dedicated links, and the first and second links are ordinary links.

Figure 6:
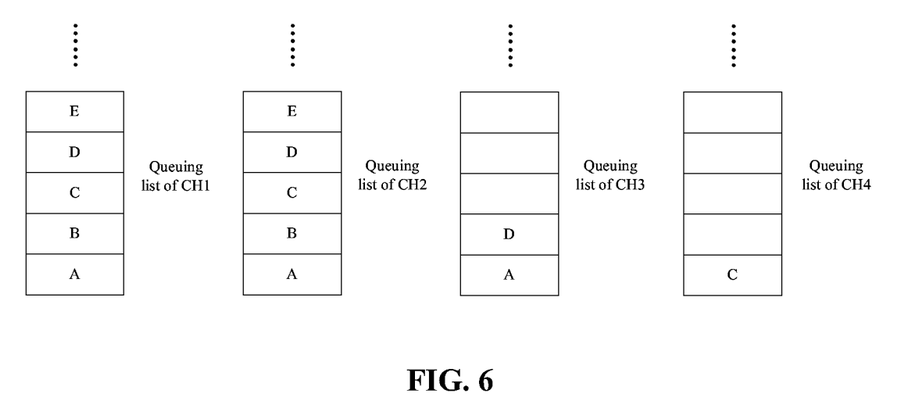
FIG. 6 is a diagram of queuing lists in the method as shown in FIG. 3.

In the embodiment as shown in FIG. 6, the multi-link Wi-Fi system includes a first link CH1, a second link CH2, a third link CH3 and a fourth link CH4, and queuing lists of these links are illustrated in FIG. 6. The third and fourth links are dedicated links, and the first and second links are ordinary links.

Figure 7:
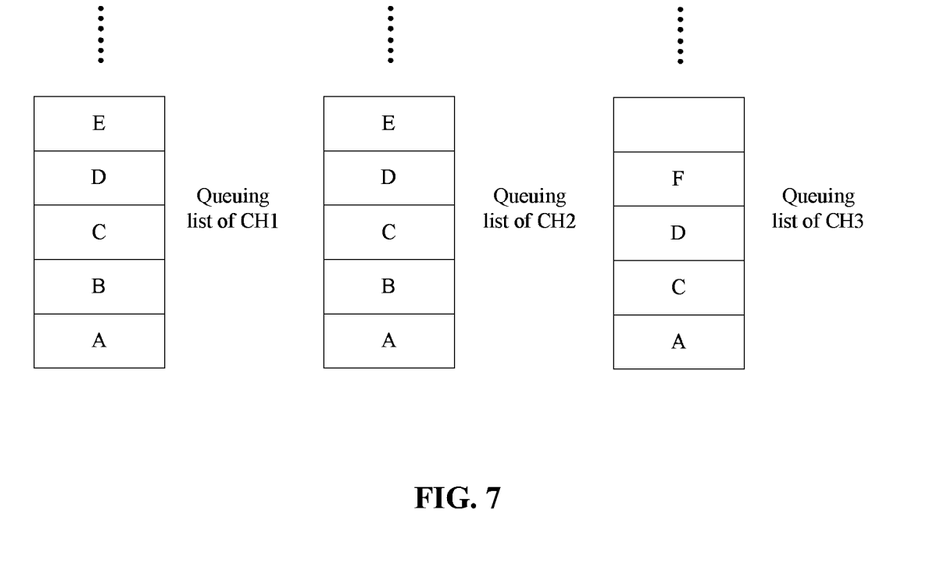
FIG. 7 is a diagram of queuing lists in the method as shown in FIG. 3.

In the embodiment as shown in FIG. 7, the multi-link Wi-Fi system includes a first link CH1, a second link CH2 and a third link CH3, and queuing lists of these links are illustrated in FIG. 7. The third link is a dedicated link, and the first and second links are ordinary links.

In some embodiments, the AP may configure a portion of the plurality of links as dedicated link, and broadcast index information of the dedicated link. Therefore, the STA can determine which links are dedicated links.

In some embodiments, the AP may configure a portion of the plurality of links as dedicated link in a default way.

In some embodiments, the STA may receive index information of the dedicated link, and configure a portion of the plurality of links as dedicated link based on the index information.

In some embodiments, the STA may configure a portion of the plurality of links as dedicated link in a default way.

In S12, links for control frames to be transmitted and data frames to be transmitted are determined.

In some embodiments, after a portion of the plurality of links is determined as dedicated link, the STA may determine links for control frames to be transmitted and data frames to be transmitted, and add the control frames to be transmitted and the data frames to be transmitted into queuing lists of the corresponding links.

In some embodiments, determining links for control frames to be transmitted and data frames to be transmitted includes: configuring the control frames to the dedicated link.

For example, in the embodiment as shown in FIG. 4, the data to be transmitted includes an ordinary control frame A, a data frame B, an ordinary control frame C, an ordinary control frame D and a data frame E. The five frames are all in queuing lists of the first link and the second link. As the frames A, C and D are the ordinary control frames, they are duplicated to a queuing list of the third link.

For another example, in the embodiment as shown in FIG. 5, the data to be transmitted includes an ordinary control frame A, a data frame B, an ordinary control frame C, an ordinary control frame D and a data frame E. The five frames are all in queuing lists of the first link and the second link. As the frames A, C and D are the ordinary control frames, they are duplicated to queuing lists of the third and fourth links.

In some embodiments, determining links for control frames to be transmitted and data frames to be transmitted includes: dividing the control frames to a plurality of groups; and duplicating the plurality of groups of control frames to queuing lists of different dedicated links.

For example, in the embodiment as shown in FIG. 6, the data to be transmitted includes an ordinary control frame A, a data frame B, an ordinary control frame C, an ordinary control frame D and a data frame E. The five frames are all in queuing lists of the first link and the second link. As the frames A, C and D are the ordinary control frames, a first group consisting of the frames A and D is duplicated to a queuing list of the third link, and a second group consisting of the frame C is duplicated to a queuing list of the fourth link.

For another example, in the embodiment as shown in FIG. 7, the data to be transmitted includes an ordinary control frame A, a data frame B, an ordinary control frame C, an ordinary control frame D, a data frame E and a dedicated control frame F. The frames A, B, C, D and E are all in queuing lists of the first link and the second link. As the frames A, C and D are the ordinary control frames, and the frame F is the dedicated control frame, the frames A, C and D are duplicated to a queuing list of the third link, and the frame F is arranged in the queuing list of the third link.

In S13, when the dedicated link or the ordinary link obtains a transmission opportunity, a control frame or a data frame at a head of a queuing list of the link is transmitted.

In the embodiment as shown in FIG. 4, if the first link obtains a transmission opportunity, the STA or the AP transmits the ordinary control frame A on the first link. In some embodiments, after the frame A starts to be transmitted, the third link obtains a transmission opportunity, and thus the ordinary control frame C is transmitted on the dedicated link.

Embodiments as shown in FIG. 5 to FIG. 7 are similar to the embodiment as shown in FIG. 4, and are not described in detail here.

Figure 8:
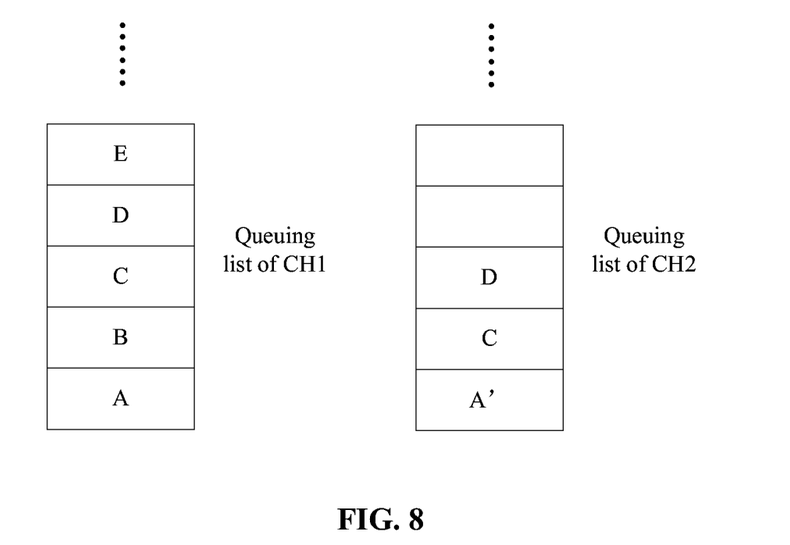
FIG. 8 is a diagram of queuing lists in the method as shown in FIG. 3.

Referring to FIG. 8, in the embodiment as shown in FIG. 8, the first link CH1 is an ordinary link, and the second link CH2 is a dedicated link. Frames A, C and D are ordinary control frames, and frames B and E are data frames.

In some embodiments, after transmission of one ordinary control frame on one link is completed, the ordinary control frame cannot be transmitted again on other links. Referring to FIG. 4, when transmission of the frame C or D on the first link is completely, the frame C or D is removed from the queuing lists of the second link and the third link, that is, the frame C or D cannot be transmitted again on the second or third link.

In some embodiments, after transmission of one ordinary control frame on the ordinary link is completed, the ordinary control frame can be transmitted again on the dedicated link; or, after transmission of one ordinary control frame on the dedicated link is completed, the ordinary control frame can be transmitted again on the ordinary link.

In some embodiments, after one ordinary control frame starts to be transmitted on the ordinary link, the ordinary control frame can be transmitted again on the dedicated link; or, after one ordinary control frame starts to be transmitted on the dedicated link, the ordinary control frame can be transmitted again on the ordinary link.

In the embodiment as shown in FIG. 8, the AP duplicates the frame A to a queuing list of the second link (frame A'), and may further configure that the frame A can be repeatedly transmitted on the ordinary link and the dedicated link. In some embodiments, after the frame A starts to be transmitted on the first link, the frame A' may also be transmitted on the second link, or, after the frame A' starts to be transmitted on the second link, the frame A may also be transmitted on the first link. In some embodiments, after transmission of the frame A on the first link is completed, the frame A' may be transmitted on the second link, or, after transmission of the frame A' on the second link is completed, the frame A may be transmitted on the first link.

In some embodiments, some STAs do not support a multi-link Wi-Fi system, however, the above mechanism that allows ordinary control frames to be repeatedly transmitted on multiple links ensures that the STAs can receive ordinary control frames, thereby improving compatibility and stability of the system.

Figure 9:
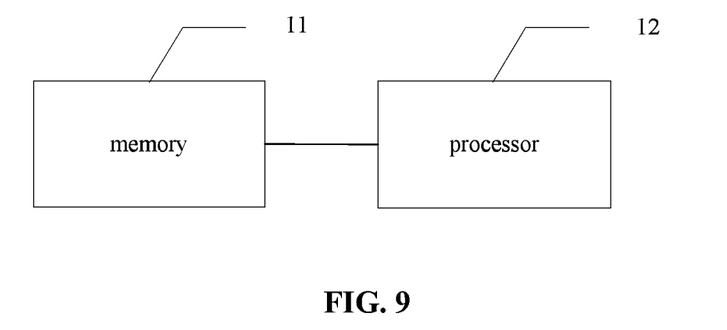
FIG. 9 is a structural diagram of a data transmission device according to an embodiment.

Referring to FIG. 9, FIG. 9 is a structural diagram of a data transmission device according to an embodiment. The device may be applied in a STA or an AP. The device includes a memory 11 and a processor 12, where the memory 11 has a computer program stored therein which can be run on the processor 12 and is for implementing steps in the above data transmission method, and when the processor 12 executes the computer program, the steps are performed. The memory 11 may include a Read Only Memory (ROM), a Random Access Memory (RAM), a magnetic disk or an optical disk. The steps of the data transmission method can be referred to the above descriptions, and are not described in detail here.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A data transmission method, wherein the method is applied in a multi-link Wi-Fi system which comprises a plurality of links, each of the plurality of links comprises a queuing list for determining a transmission order of data in the link, and the method comprises:
   determining a portion of the plurality of links as dedicated link, and the other portion of the plurality of links as ordinary link, wherein the dedicated link is configured to transmit control frames which comprise ordinary control frames and dedicated control frames, and the ordinary link is configured to transmit data frames and ordinary control frames;
   determining links among the dedicated link and the ordinary link for the control frames to be transmitted and the data frames to be transmitted; and
   based on obtaining a transmission opportunity on the dedicated link or the ordinary link, transmitting a control frame or a data frame at a head of a queuing list of the link,
   wherein after transmission of one ordinary control frame on the ordinary link is completed, the one ordinary control frame can be transmitted again on the dedicated link; or, after transmission of one ordinary control frame on the dedicated link is completed, the one ordinary control frame can be transmitted again on the ordinary link;

wherein after one ordinary control frame starts to be transmitted on the ordinary link, the one ordinary control frame can be transmitted again on the dedicated link; or, after one ordinary control frame starts to be transmitted on the dedicated link, the one ordinary control frame can be transmitted again on the ordinary link, wherein the dedicated link is configured to transmit on a first channel occupying a frequency band with a center frequency of 2 Ghz or 5 Ghz, and the ordinary link is configured to transmit on a second channel occupying a frequency band with a center frequency of 2 Ghz or 5 Ghz.

2. The method according to claim 1, wherein determining a portion of the plurality of links as dedicated link comprises:

an access point configuring a portion of the plurality of links as dedicated link.

3. The method according to claim 2, wherein after the portion of the plurality of links is determined as dedicated link, the method further comprises:

the access point broadcasting index information of the dedicated link.

4. The method according to claim 1, determining a portion of the plurality of links as dedicated link comprises:

an access point configuring a portion of the plurality of links as dedicated link in a default way.

5. The method according to claim 1, determining a portion of the plurality of links as dedicated link comprises:

a station receiving index information of the dedicated link; and configuring a portion of the plurality of links as dedicated link based on the index information.

6. The method according to claim 1, determining a portion of the plurality of links as dedicated link comprises:

a station configuring a portion of the plurality of links as dedicated link in a default way.

7. The method according to claim 1, wherein determining links among the dedicated link and the ordinary link for the control frames to be transmitted and the data frames to be transmitted comprises:

configuring the control frames to the dedicated link.

8. The method according to claim 1, wherein determining links among the dedicated link and the ordinary link for the control frames to be transmitted and the data frames to be transmitted comprises:

dividing the control frames to a plurality of groups; and duplicating the plurality of groups of control frames to queuing lists of different dedicated links.

9. A data transmission device comprising a memory and a processor, wherein the memory has a computer program stored therein, and when the processor executes the computer program, the method according to claim 1 is performed.

* * * * *